United States Patent [19]

Darby

[11] 4,436,513
[45] Mar. 13, 1984

[54] FREE-SAIL SYSTEM SAILBOARD SIMULATOR

[76] Inventor: Kenneth S. Darby, R.D. 1, Box 311, Falls, Pa. 18615

[21] Appl. No.: 365,451

[22] Filed: Apr. 5, 1982

[51] Int. Cl.³ .............................................. G09B 9/06
[52] U.S. Cl. ...................................... 434/60; 272/146
[58] Field of Search ........................ 434/60, 247, 253; 272/69, 97, 146

[56] References Cited

U.S. PATENT DOCUMENTS

| | | | |
|---|---|---|---|
| 2,256,001 | 9/1941 | Titus | 272/146 |
| 2,785,896 | 3/1957 | Ellis | 272/69 X |
| 3,021,137 | 2/1962 | Palmer et al. | 272/97 |
| 3,134,591 | 5/1964 | Conn | 272/146 |
| 4,021,934 | 5/1977 | Taylor | 434/60 |
| 4,252,312 | 2/1981 | Dehan | 272/97 |
| 4,291,873 | 9/1981 | Lee et al. | 272/146 |

*Primary Examiner*—William H. Grieb

[57] ABSTRACT

A safer simulator for instructing free-sail system sailboarding consisting of a low to the ground disc-shaped deck with non-clogging casters.

1 Claim, 4 Drawing Figures

FREE-SAIL SYSTEM SAILBOARD SIMULATOR

BACKGROUND OF THE INVENTION

As early as 1964, free-sail systems, now known as sailboards, began sailing on waters in the United States as a new sport. The sailboards have improved considerably over the past eighteen years, requiring the participant to be trained before getting on a sailboard in the water. Numerous devices called simulators have shown up in different parts of the country. These simulators are used to teach the new sailor of the free-sail system how to hold the sail, steer the boat, and all other sailing maneuvers before going on the water. Most of them consist of at least four legs that spread out from the center for stability and have a sailboard or section of a sailboard attached on top that rotates around an axis. Many beginners have been injured when falling from the simulator by twisting an ankle on the extended legs of the simulator or when getting hit by the rotating board. Often boards have been cut to make them shorter, but they are still longer than they are wide and will hit the student or instructor when stepping off or near the board while it is rotating. It is also difficult to tell the bow from the stern on a midsection board. There is a need for a safer simulator on which to instruct beginners.

BRIEF DESCRIPTION OF THE INVENTION

The present invention is an improvement in the simulator because it is lower to the ground and is a complete circle which eliminates the hazards associated with the present state of the art simulators. This simulator rotates around a simple bearing in combination with inverted casters to eliminate malfunctioning when used on sandy beaches. It is also comprised of a hull-shaped elevated surface to provide the feel of a sailboard under the beginner's feet.

DETAILED DESCRIPTION OF THE INVENTION

Figure 1:
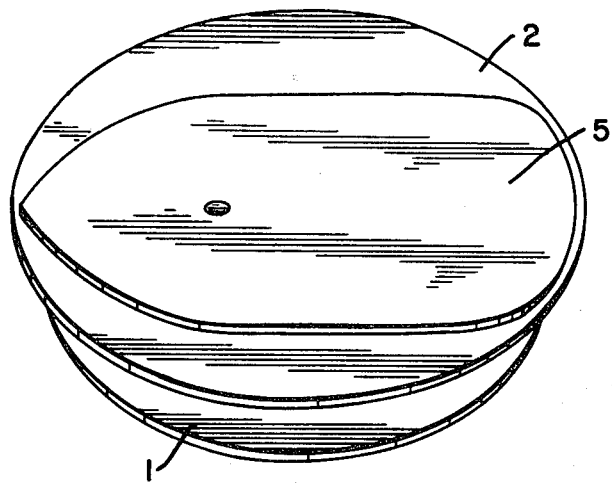
Figure 4:
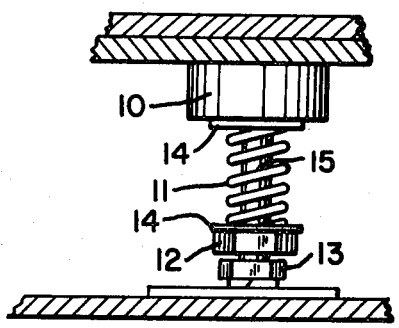
Figure 2:
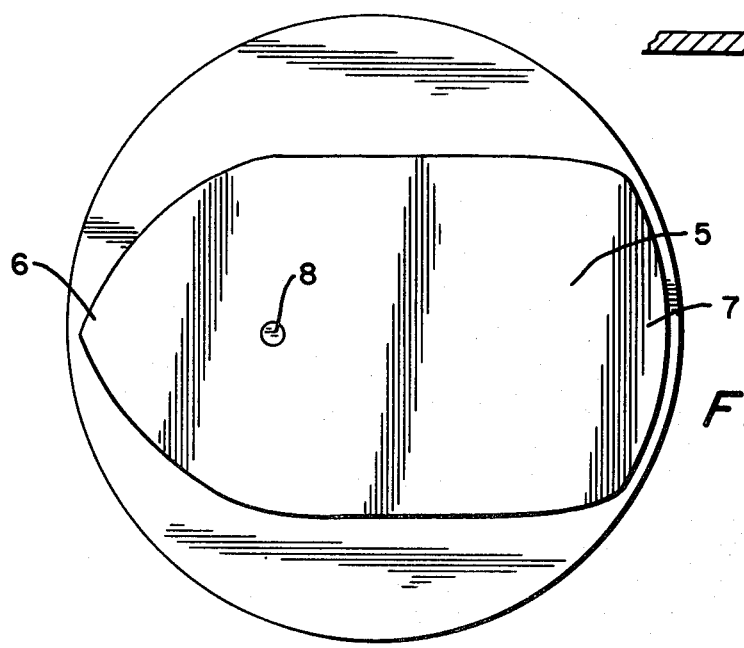
Figure 3:
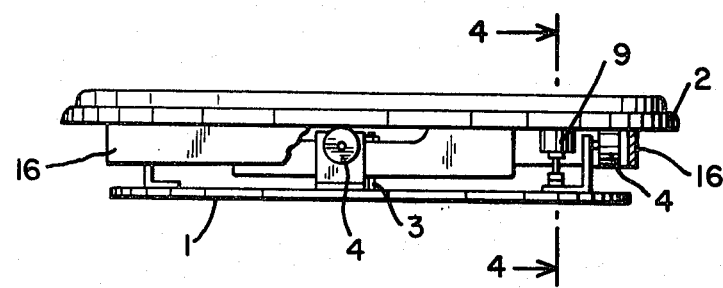

Referring to the drawings, the present invention can be better understood in one embodiment consisting of two discs, one being the base(1) and the other the deck(2), which are held together by a bearing(3) but apart by inverted casters(4), having a skidresistant surface(5), on the deck, shaped as a hull with bow(6) and stern(7) and swivel joint mounting hole(8), and it may have an adjustable dampener(9) with spring tension, as shown in detail A-A, comprising of a dampener pad(10), a spring(11), adjusting nut(12), anchoring nut(13), washers(14), and shaft(15). The edges of the hull shape on the deck disc, as well as the edges of both discs, are rounded for safety. A cylindrical guard(16) extends below the deck and on the outside radius of the casters so that fingers are kept away from the casters when the simulator is turning.

What I claim is:

1. An improvement in the design of a simulator to be used to instruct sailing on a free-sail system sailboard consisting of two complete discs of plywood or other material to form a base and a deck, having a hull-shaped non-skid area on the upper disc and within the diameter of the upper disc, having a swivel joint mount on the hull area, and inverted casters mounted on the lower disc with a pivoting bearing in the center acting as an axis around which the upper disc rotates and having an adjustable dampener for regulating the ease at which a simulator rotates and a cylindrical shape guard protruding down from the upper disc to keep fingers away from the casters.

* * * * *